United States Patent
Malatek et al.

(10) Patent No.: US 11,535,192 B2
(45) Date of Patent: Dec. 27, 2022

(54) RIDE VEHICLE RESTRAINT SYSTEM WITH FORCED AIR SYSTEM

(71) Applicant: Universal City Studios LLC, Universal City, CA (US)

(72) Inventors: Garrett Malatek, Orlando, FL (US); Rachel Sarah Wilcox, Orlando, FL (US); Luis Carlos Alarcon, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/118,297

(22) Filed: Dec. 10, 2020

(65) Prior Publication Data

US 2021/0179013 A1 Jun. 17, 2021

Related U.S. Application Data

(60) Provisional application No. 62/947,463, filed on Dec. 12, 2019.

(51) Int. Cl.
*B60R 22/48* (2006.01)
*A63G 31/00* (2006.01)
*A63G 7/00* (2006.01)
*B60R 21/00* (2006.01)

(52) U.S. Cl.
CPC ............ *B60R 22/48* (2013.01); *A63G 7/00* (2013.01); *A63G 31/00* (2013.01); *B60R 2021/0097* (2013.01)

(58) Field of Classification Search
CPC .......... A63G 31/00; A63G 31/16; A63G 7/00; B60R 22/14; B60R 2021/0097; B60R 22/48

USPC ...................................... 472/43, 59–60, 130
See application file for complete search history.

(56) References Cited

U.S. PATENT DOCUMENTS

| 5,192,247 | A | 3/1993 | Barr et al. |
| 5,403,238 | A | 4/1995 | Baxter et al. |
| 5,807,177 | A * | 9/1998 | Takemoto ............... A63F 13/02 463/47 |
| 6,224,491 | B1 | 5/2001 | Hiromi et al. |
| 7,691,002 | B2 * | 4/2010 | Casey ................. A63G 31/007 472/59 |
| 9,155,390 | B2 | 10/2015 | Ferguson et al. |
| 9,307,841 | B2 * | 4/2016 | Jamele ................... A63G 31/00 |
| 2006/0135271 | A1 | 6/2006 | Casey et al. |
| 2018/0312173 | A1 | 11/2018 | Hall |
| 2019/0118760 | A1 | 4/2019 | Hall et al. |

OTHER PUBLICATIONS

PCT/US2020/064618 International Search Report and Written Opinion dated Feb. 10, 2021.

* cited by examiner

*Primary Examiner* — Kien T Nguyen
(74) *Attorney, Agent, or Firm* — Fletcher Yoder, P.C.

(57) ABSTRACT

A ride vehicle system includes a ride vehicle including a seat configured to accommodate a passenger, a restraint system of the ride vehicle, where the restraint system includes a restraint configured to secure the passenger within the seat, and a forced air system of the ride vehicle, where the force air system is configured to generate an air flow, direct the air flow internally through the restraint, and discharge the air flow toward the passenger via a discharge port of the restraint.

20 Claims, 5 Drawing Sheets

RIDE VEHICLE RESTRAINT SYSTEM WITH FORCED AIR SYSTEM

CROSS-REFERENCE TO RELATED APPLICATION

This application claims priority to and the benefit of U.S. Provisional Application No. 62/947,463, entitled "RIDE VEHICLE RESTRAINT SYSTEM," filed Dec. 12, 2019, which is hereby incorporated by reference in its entirety for all purposes.

BACKGROUND

The present disclosure relates generally to amusement park-style rides and, more specifically, to systems for securing passengers inside a ride vehicle of the amusement park-style rides.

Many amusement park-style rides include ride vehicles that carry passengers along a ride path, such as a track. As the ride vehicle travels along the ride path, the ride vehicle may be subjected to a variety of ride path features, such as turns, loops, twists, and so forth, that are part of the ride path. Indeed, the motion or movement of the ride vehicle is affected by the ride path features. As the movement of the ride vehicle changes, the passengers inside the ride vehicle may be subjected to various forces. Accordingly, ride vehicles typically include a restraint system to secure passengers within the ride vehicle as the ride vehicle travels along the ride path.

It is common for ride vehicles and amusement park-style attractions to include other features that enhance the ride vehicle experience for passengers. For example, ride vehicles, ride paths, and/or other elements of the ride system may include lights, speakers, interactive elements, specialized environments, and/or other features that provide sensory stimulation for the passenger in the ride vehicle to enhance the ride experience. Further, it will be appreciated that passengers enjoying the ride vehicle experience may respond differently to motion of the ride vehicle as it travels along the ride path. For example, the particular motion, direction, speed, rotation, or other movement of the ride vehicle may cause passengers to experience different levels of enjoyment. Indeed, in some instances, a passenger may be susceptible to kinetosis induced by certain ride vehicle motions and/or other elements of the ride system experience. To mitigate kinetosis, ride vehicle systems may include a forced air system configured to discharge an air flow toward passengers. It is now recognized that existing forced air systems may not be suitable for certain ride vehicle systems. Accordingly, there is a need for improved forced air systems for use with ride vehicles.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a ride vehicle system includes a ride vehicle including a seat configured to accommodate a passenger, a restraint system of the ride vehicle, where the restraint system includes a restraint configured to secure the passenger within the seat, and a forced air system of the ride vehicle, where the force air system is configured to generate an air flow, direct the air flow internally through the restraint, and discharge the air flow toward the passenger via a discharge port of the restraint.

In another embodiment, a method for providing an air flow to a ride vehicle passenger includes securing a passenger within a seat of a ride vehicle with a restraint of the ride vehicle, generating an air flow with a flow generating device of the ride vehicle, directing the air flow internally through the restraint of the ride vehicle, and discharging the air flow toward the passenger via a discharge port of the restraint.

In a further embodiment, a ride vehicle for an amusement park ride includes a seat configured to accommodate a passenger, a restraint system of the ride vehicle having a restraint configured to secure the passenger within the seat, a forced air system of the ride vehicle, where the forced air system is integrated with the restraint and is configured to generate an air flow, direct the air flow internally through the restraint, and discharge the air flow toward a face of the passenger, and a controller configured to regulate operation of the forced air system to discharge the air flow toward the face of the passenger at a constant flow rate.

DRAWINGS

These and other features, aspects, and advantages of the present disclosure will become better understood when the following detailed description is read with reference to the accompanying drawings in which like characters represent like parts throughout the drawings, wherein.

Figure 4:
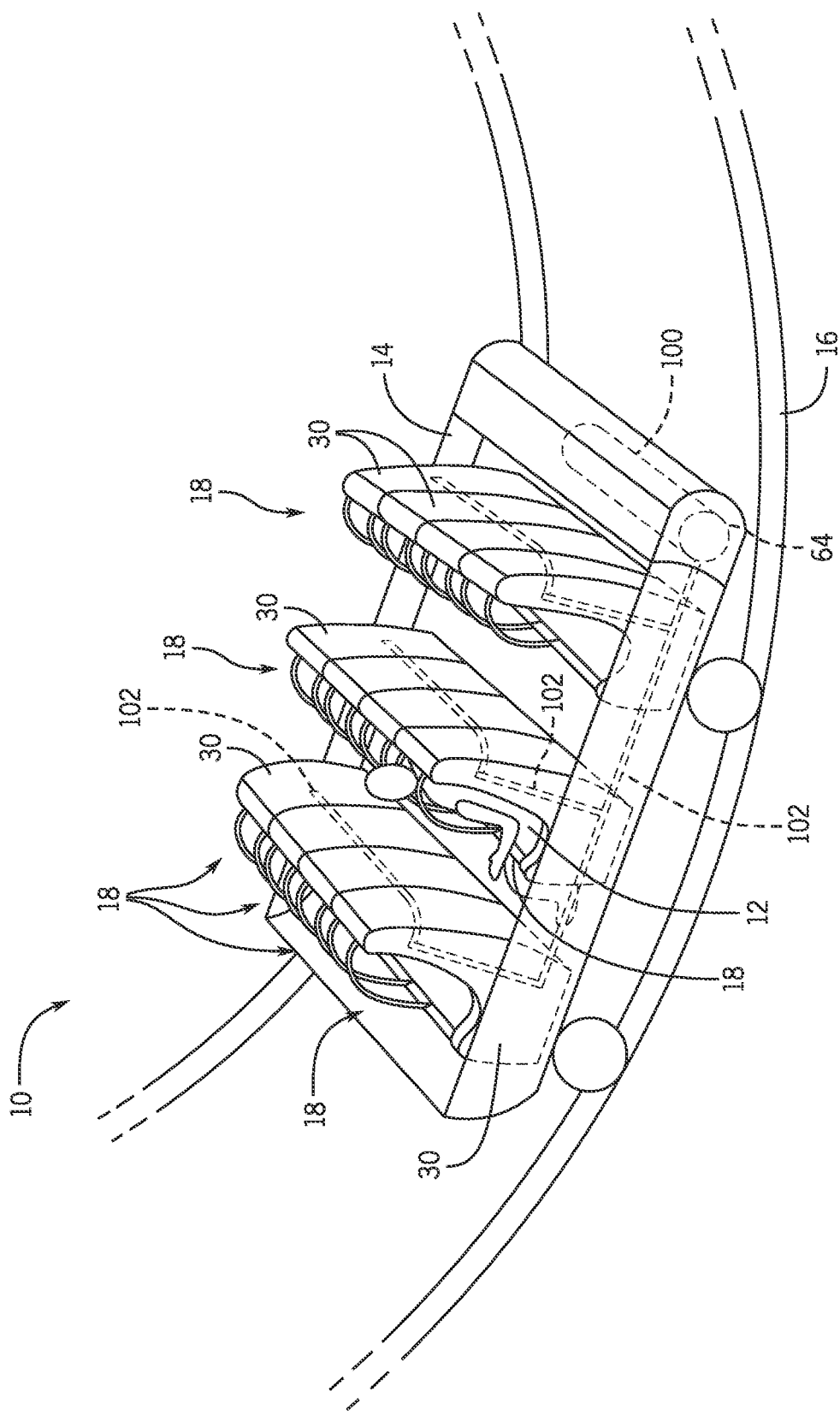
Figure 5:
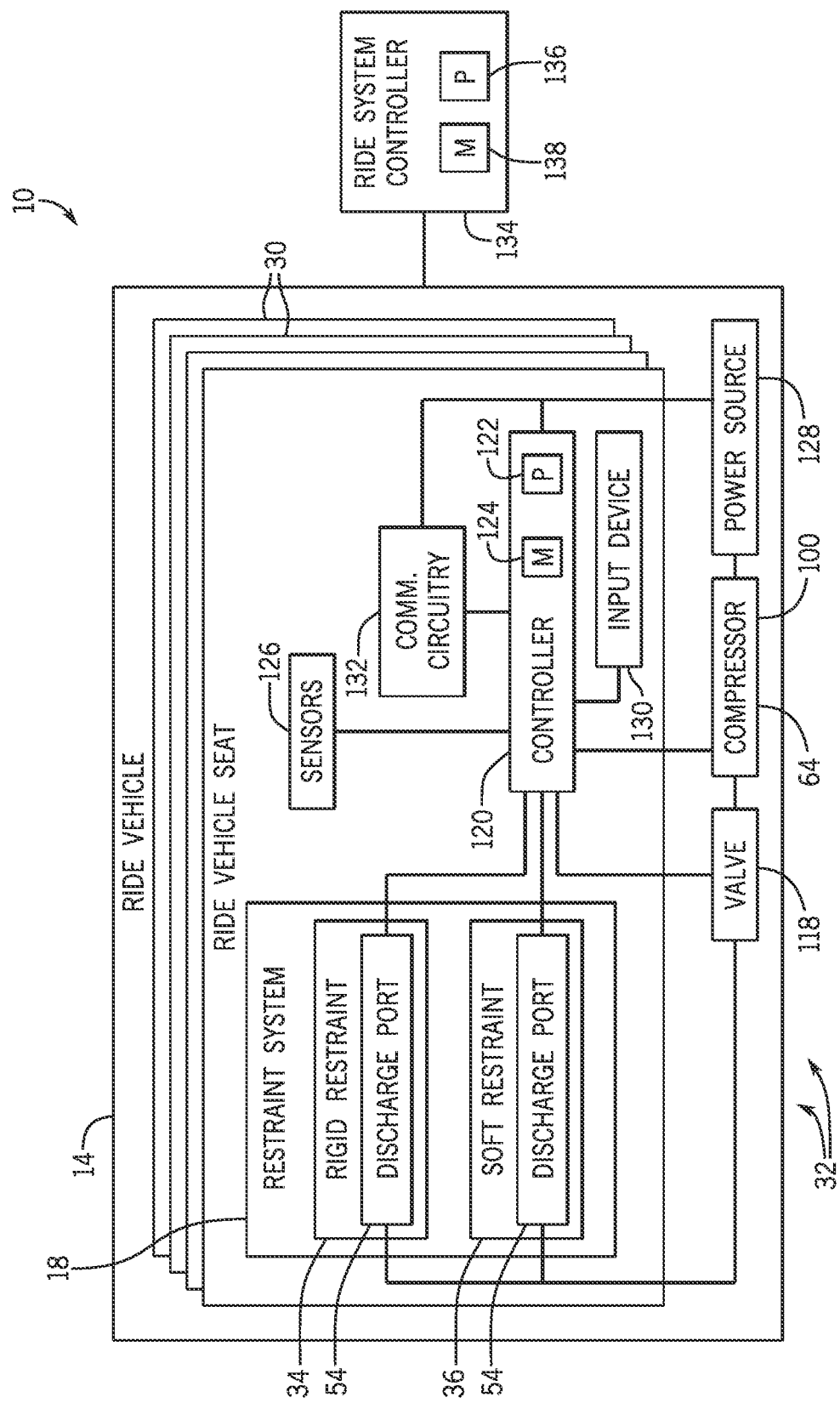

FIG. 4 is a perspective view of an embodiment of a ride system, illustrating a ride vehicle with ride vehicle seats and a forced air system integrated with the ride vehicle, in accordance with aspects of the present disclosure; and FIG. 5 is a schematic of an embodiment of a ride system, illustrating components of a forced air system integrated with a ride vehicle seat and a restraint system, in accordance with aspects of the present disclosure.

DETAILED DESCRIPTION

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that embodiments may be practiced without these specific details. In other instances, well-known methods, procedures, components, have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Amusement parks include many rides that provide unique and entertaining experiences for patrons or guests. Amusement parks typically include a wide variety of rides to accommodate the thrill sensitivities and immersive experience desires of different guests. In many instances, amusement park rides include one or more ride vehicles that follow a ride path, such as a track, through a series of features. Such features may include loops, twists, turns, drops, tunnels, and so forth. The ride vehicles may travel along the ride path at high speeds and may traverse along multiple non-linear paths. As a result, passengers riding inside the ride vehicles may experience forces that may move the passengers within the ride vehicle if not otherwise restrained. Accordingly, ride vehicles frequently include restraint systems configured to secure a passenger within the ride vehicle while the ride vehicle is operating and throughout a duration of the ride experience.

Amusement park rides also frequently include other features, such as environmental systems and special effects, configured to provide a more immersive and thrilling experience for the passengers on the amusement park ride. For example, amusement park rides, including ride vehicles, ride vehicle seats, and environments along the ride path, may include a variety of sensory stimulation systems. These systems can include light emitting devices, sound emitting devices, vibrational systems, thermal systems, liquid (e.g., water) spray systems, or other systems configured to stimulate one or more senses of the ride passengers.

As will be appreciated, different amusement park guests and ride vehicle passengers may respond differently to amusement park ride experiences. For example, different passengers may respond differently to different travel speeds, special effects, environmental elements, and so forth of an amusement park ride. In order to improve an amusement park ride experience for passengers, present embodiments include a forced air system for an amusement park-style ride vehicle. In particular, the forced air system may be integrated with a restraint system of the ride vehicle and is configured to output a flow of air towards a ride passenger (e.g., a face of the passenger) secured in the ride vehicle via the restraint system. The forced air system may be configured to operate in one or more operating modes to provide one or more different effects for the ride passenger. For example, in a first mode, the forced air system may output a constant air flow toward the passenger at a relatively low flow rate in order to mitigate inducement of kinetosis in passengers that may be susceptible to kinetosis during the amusement park ride experience. Specifically, the forced air system may direct the constant air flow toward a face of the passenger to better achieve kinetosis mitigation. In another mode, the forced air system may output an intermittent air flow discharged toward the passenger at a relatively elevated flow rate in order to induce a particular sensory effect (e.g., which may correlate with other effects or features of the amusement park ride experience).

The forced air system may be integrated with the ride vehicle restraint system, such as a rigid restraint or a soft restraint. By integrating the forced air system with the ride vehicle restraint system, the ride vehicle may not include other structural components typically included with ride vehicles to support forced air systems. For example, the disclosed embodiments do not include a separate hood disposed over a passenger or other supplemental structure dedicated to supporting the forced air system, thereby improving the aesthetics and functionality of the ride vehicle. Indeed, the disclosed embodiments also enable the incorporation of forced air systems into ride vehicles that traditionally are unable to include forced air systems (e.g., due to the particular configuration of the ride vehicle or ride vehicle system).

Figure 1:
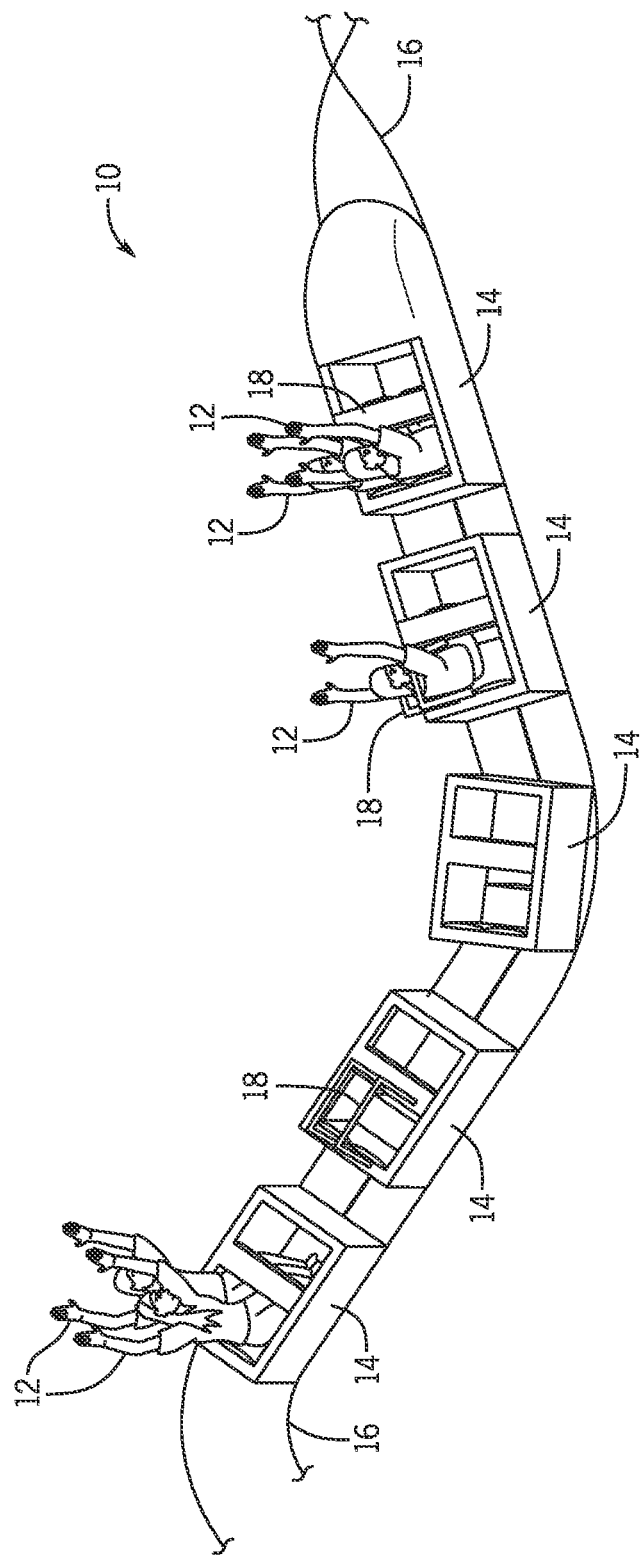
FIG. 1 is a perspective view of an embodiment of a ride system, in accordance with aspects of the present disclosure.

Turning now to the drawings, FIG. 1 is a perspective view of an embodiment of a ride system 10. The ride system 10 may include one or more ride vehicles 14 that hold one or more passengers 12. In some embodiments, multiple ride vehicles 14 may be coupled together (e.g., by a linkage). The ride vehicle 14 travels along a ride path 16 during operation of the ride system 10. The ride path 16 may be any surface on which the ride vehicle 14 travels. For example, the ride path 16 may be defined by a track. The ride path 16 may or may not dictate the path traveled by the ride vehicle 14. In an embodiment, the ride path 16 may control the movement (e.g., direction, speed, and/or orientation) of the ride vehicle 14 as it progresses along the ride path 16, similar to a train on tracks. In another embodiment, another system may control the path taken by the ride vehicle 14 during operation of the ride system 10. For example, the ride path 16 may be an open surface that allows the passengers 12 to control certain aspects of the movement of the ride vehicle 14 via an interface system of the ride vehicle 14. As will be appreciated, the ride system 10 may include any suitable number of ride vehicles 14, and each ride vehicle 14 may accommodate any suitable number of passengers 12.

As illustrated, the ride vehicles 14 also include restraint systems 18 configured to secure the passengers 12 within the ride vehicles 14. Each ride vehicle 14 includes at least one restraint system 18, although, in some embodiments, the ride system 10 may include separate restraint systems 18 for each passenger 12. In other words, in an embodiment, each ride vehicle 14 may include a number of restraint systems 18 equal to a total number of the passengers 12 that may ride in the ride vehicle 14 during the ride system 10 experience. The restraint system 18 may include a soft restraint that is configured to conform to a portion of a body, such as a torso front side, of the passenger 12 and/or a hard restraint that is configured to rigidly extend over the body of the passenger 12.

As mentioned above, the restraint system 18 also includes a forced air system integrated therein. For example, the forced air system may be at least partially integrated with a hard restraint or a soft restraint of the restraint system 18. In some embodiments, other components of the forced air system may be disposed at other portions of the ride vehicle 14, such as on a frame or body of the ride vehicle 14 and/or within a seat of the ride vehicle 14. The forced air system may be configured to operate in one or more modes in order to induce various effects in the passenger 12, such as to mitigate inducement of kinetosis in passengers 12.

It should be appreciated that the embodiment of the ride system 10 illustrated in FIG. 1 is a simplified representation intended to provide context and facilitate discussion of the presently disclosed techniques. Other embodiments of the ride system 10, including the ride vehicle 14, the ride path 16, the restraint system 18, and so forth may include similar and/or different elements or configurations. For example, while the illustrated embodiment depicts the ride vehicles 14 traveling along the ride path 16 that is positioned beneath the ride vehicles 14, other embodiments of the ride system 10 may include ride vehicles 14 that are suspended from the ride path 16 positioned above the ride vehicles. Additionally, while the illustrated restraint system 18 is shown as including a bar or other restraint positioned across the lap or legs of the passengers 12, other embodiments of the restraint system 18 may include additional or alternative components configured to restrain or otherwise confine the passengers 12 to the ride vehicle 14 during the ride system 10 operation.

Figure 2:
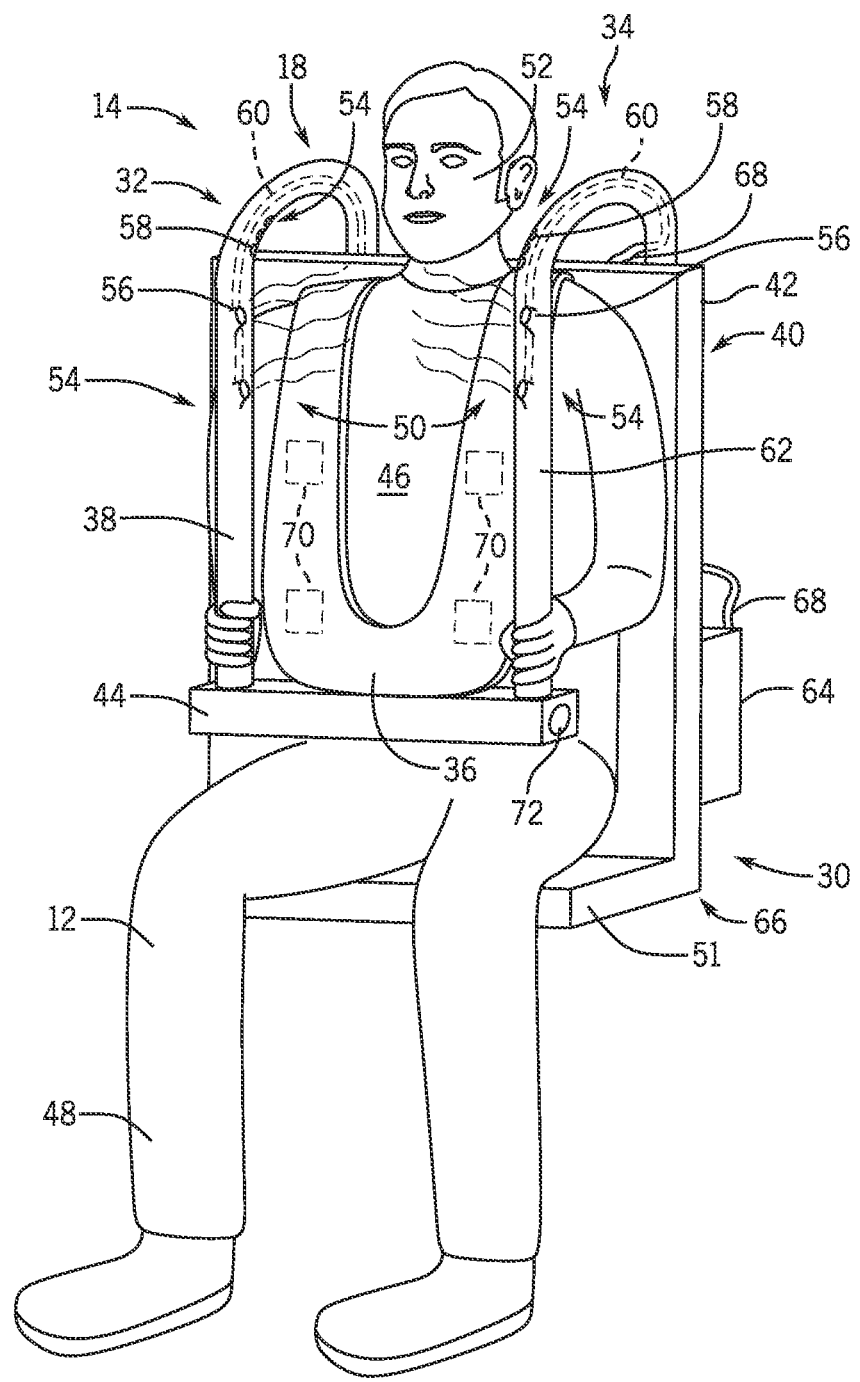
FIG. 2 is a perspective view of an embodiment of a ride vehicle seat of a ride vehicle, illustrating a forced air system integrated with a restraint system of the ride vehicle seat, in accordance with aspects of the present disclosure.

FIG. 2 is perspective view of an embodiment of a seat 30 of the ride vehicle 14 that may accommodate one of the passengers 12. In some embodiments, the seat 30 functions as the ride vehicle 14 and is separate from other ride vehicles 14 and/or seats 30, while in other embodiments, the seat 30 is one of multiple seats 30 within a common ride vehicle 14. As shown, the seat 30 includes an embodiment of the restraint system 18 configured to secure the passenger 12 within the seat 30 and/or within the ride vehicle 14. As shown, the restraint system 18 has a forced air system 32 (e.g., sensory stimulation system) integrated therein. These and other features will be discussed in further detail below.

The illustrated restraint system 18 includes a rigid restraint 34 (e.g., hard shell restraint) and a soft restraint 36 (e.g., soft shell restraint). However, in other embodiments, the restraint system 18 may include either the rigid restraint 34 or the soft restraint 36. The rigid restraint 34 may include components that are generally fixed, rigid, inelastic, and/or inflexible. In other words, the components of the rigid restraint 34 may generally have a fixed geometry, such as components made from metal, plastic, a composite material, or other suitably rigid material. When the restraint system 18 is in a locked or deployed configuration, the components of the rigid restraint 34 may be generally immovable and may thereby block or prevent undesirable movement of the passenger 12 within the seat 30 and/or within the ride vehicle 14.

In the illustrated embodiment, the rigid restraint 34 includes over-shoulder bars 38 that extend from a rear side 40 of the seat 30, over a seat back 42 of the seat 30, and across a front side of the passenger 12 positioned in the seat 30. To enable transition of the over-shoulder bars 38 between the deployed configuration shown and a retracted configuration, the over-shoulder bars 38 may be pivotably coupled to the seat back 42, a component of the seat 30, or a component of the ride vehicle 14. The restraint system 18 may be configured to enable (e.g., via a locking system) selective rotation of the over-shoulder bars 38 relative to the seat 30. The rigid restraint 34 also includes a lap bar 44 coupled to distal ends of the over-shoulder bars 38. In the deployed configuration shown, the over-shoulder bars 38 extend over the front side of the passenger 12 to position the lap bar 44 adjacent to the legs and waist of the passenger 12. During operation of the ride system 10, the rigid restraint 34 may be locked and secured in the illustrated configuration. In this manner, the rigid restraint 34 may secure the passenger 12 within the seat 30. In particular, the over-shoulder bars 38 may retain a torso 46 of the passenger 12 substantially against the seat back 42, and the lap bar 44 may retain legs 48 of the passenger 12 substantially against a base 51 of the seat 30.

The soft restraint 36 may be formed from a pliable material configured to be applied and secured against a body of the passenger 12. For example, the soft restraint 36 may include a fabric, canvas, plastic, nylon, webbing, or other flexible material that may generally conform or contour to another object, such as the torso 46 of the passenger 12. In the illustrated embodiment, the soft restraint 36 has a vest-like or U-shaped configuration that is configured to be positioned over and against the torso 46 of the passenger 12 when the passenger 12 is seated in the seat 30 and/or the ride vehicle 14. However, in other embodiments, the soft restraint 36 may have other suitable configurations, such as a wrap, a sleeve, or other covering, that may cover a large surface area of the torso 46 and/or any other body part (e.g., arm, leg, hand, foot) of the passenger 12 that is not otherwise in contact with the seat 30 or the rigid restraint 34.

The restraint system 18 also includes the forced air system 32 integrated therein. That is, the restraint system 18 may integrally include and/or form one or more components of the forced air system 32. The forced air system 32 is configured to generate and control an air flow 50 directed toward the passenger 12, such as toward a face 52 of the passenger 12. For example, the forced air system 32 may operate to discharge the air flow 50 toward the face 52 of the passenger 12 to mitigate inducement of kinetosis in the passenger 12 and/or to create another sensory response and/or effect for the passenger 12.

The forced air system 32 shown in the illustrated embodiment is integrated with the rigid restraint 34. In particular, the rigid restraint 34 includes discharge ports 54 coupled to and/or formed in the over-shoulder bars 38 of the rigid restraint 34. The discharge ports 54 are configured to (e.g., arranged, positioned, oriented, etc.) to receive the air flow 50 from within the over-shoulder bars 38 and output the air flow 50 toward the face 52 of the passenger 12. In some embodiments, the discharge ports 54 may be nozzles 56 configured to accelerate the air flow 50 discharged toward the face 52 of the passenger 12. Additionally or alternatively, the discharge ports 54 may include holes 58 (e.g., apertures, openings, etc.) formed in the over-shoulder bars 38 and configured to discharge the air flow 50 toward the face 52.

The discharge ports 54 are fluidly coupled to one or more conduits 60 (e.g., hoses, tubes, etc.) extending internally through the over-shoulder bars 38. The conduits 60 direct the air flow 50 therethrough and to the discharge ports 54. In other embodiments, the conduits 60 may be disposed external to and may be fixed to the over-shoulder bars 38 or to another portion of the restraint system 18. In still further embodiments, the conduits 60 may be excluded from the forced air system 32, and the air flow 50 may be directed through an internal cavity 62 of the over-shoulder bars 38. In other words, the over-shoulder bars 38 may be hollow structures that are configured to receive the air flow 50 and direct the air flow 50 to the discharge ports 54 formed in or coupled to the over-shoulder bars 38.

The air flow 50 discharged via the discharge ports 54 may be generated via a pump, blower, fan, compressor, or other flow generating device or system 64. For example, the flow generating device 64 may be coupled to the seat 30, such as on the rear side 40 of the seat back 42 or an underside 66 of the base 51 of the seat 30. As discussed further below, the flow generating device 64 may be disposed at other locations of the ride vehicle 14 in other embodiments. The air flow 50 generated by the flow generating device 64 is directed through an external conduit 68 (e.g., hose, pipe, tube, etc.) coupled to the flow generating device 64. The external conduit 68 directs the air flow 50 to the over-shoulder bars 38. For example, the external conduit 68 may be fluidly coupled to the conduits 60 disposed within the over-shoulder bars 38 and/or to the internal cavities 62 of the over-shoulder bars 38 in order to enable supply of the air flow 50 to the discharge ports 54. In this way, the forced air system 32 is configured to generate the air flow 50 and direct the air flow 50 toward the face 52 of the passenger 12. As components of the forced air system 32 are integrated within the restraint system 18, the forced air system 32 is more seamlessly integrated within ride vehicle 14 and does not include other external, additional components typically incorporated in existing ride vehicles having forced air systems. Indeed, the disclosed embodiments enable incorporation of the forced air system 32 with ride vehicles 14 that may be traditionally incompatible with providing forced air flows to passengers 12.

As mentioned above, the forced air system 32 is configured to direct the air flow 50 towards the face 52 of the passenger 12. As a result, the forced air system 32 is configured to generate a sensory effect in the passenger 12. For example, in one operating mode (e.g., a first operating mode), the forced air system 32 may be configured to generate and discharge a constant, relatively low air flow 50 toward the face 52 of the passenger 12, which may be effective in mitigating or eliminating the inducement of kinetosis in the passenger 12 before, during, and/or after the passenger 12 experiences the amusement park ride experience in the ride vehicle 14. To this end, the discharge ports 54 may be positioned in any suitable location and/or orientation relative to the rigid restraint 34, an expected location of the face 52 of the passenger 12 when the passenger 12 is secured within the seat 30 via the rigid restraint 34, and so forth. In some embodiments, the discharge ports 54 may be pivotable or otherwise adjustable to modify a direction of the air flow 50 discharged from the discharge ports 54.

The forced air system 32 may also be configured to operate in a second operating mode, in which the forced air system 32 generates intermittent, higher velocity bursts of air flow 50 discharged towards the face 52 of the passenger 12. Such blasts of the air flow 50 may enhance the sensory experience for the passenger 12 during the amusement park ride experience. Indeed, the operation of the forced air system 32 in the second operating mode may be coordinated with other operations, features, or effects of the ride system 10. For example, in the illustrated embodiment, the soft restraint 36 includes sensory stimulation modules 70 configured generate one or more effects, forces, elements, stimulations, or sensations for the passenger 12. The sensory stimulation modules 70 may include vibrational motors or actuators, thermal generators or elements, aromatic elements, light emitters, controllers, power sources, sensors, or other components configured to provide the sensory sensations for the passenger 12. Operation of the forced air system 32 and the sensory stimulation modules 70 may be coordinated to provide a desired effect or experience for the passenger 12. It should be appreciated that operation of the forced air system 32 may also be coordinated with other aspects or characteristics of the ride system 10, such as environmental elements of the ride system 10.

In some embodiments, the forced air system 32 may be configured to operate in the first operating mode (e.g., to mitigate onset of kinetosis) as a baseline operating mode, and the forced air system 32 may intermittently operate in the second operating mode (e.g., to generate a coordinated sensory effect with the amusement park ride experience). In other words, during the amusement park ride experience, the forced air system 32 may operate in the second operating mode at coordinated times that coincide with other features or elements of the amusement park ride experience, and the forced air system 32 may otherwise operate in the first operating mode when not operating in the second operating mode. To this end, the forced air system 32 may include additional components configured to control or regulate operation of the forced air system 32. In some embodiments, the forced air system 32 may include a user input device 72 (e.g., a button, a switch, etc.) configured to the passenger 12 to enable, disable, or otherwise control the air flow 50 discharged by the forced air system 32. Additional control components are discussed in greater detail below.

Figure 3:
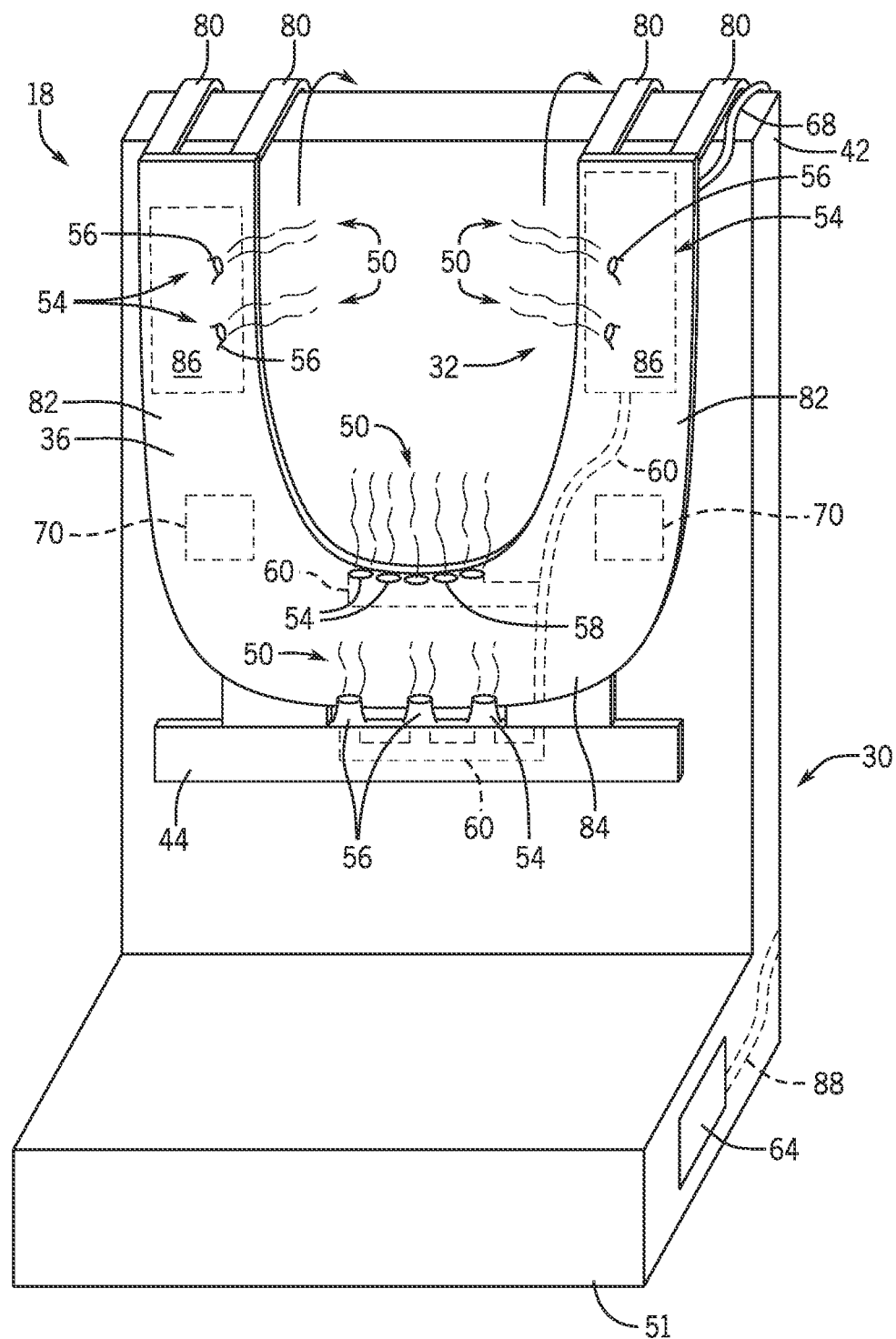
FIG. 3 is a perspective view of an embodiment of a ride vehicle seat of a ride vehicle, illustrating a forced air system integrated with a restraint system of the ride vehicle seat, in accordance with aspects of the present disclosure.

FIG. 3 is a schematic of an embodiment of the seat 30 of the ride vehicle 14, illustrating the restraint system 18 having the forced air system 32 integrated with the soft restraint 36. As mentioned above, the soft restraint 36 may be configured to be applied against the torso 46 and/or another body portion of the passenger 12 sitting in the seat 30 to secure the passenger 12 within the seat 30. For example, the soft restraint 36 may be formed from a pliable material, such as fabric, rubber, a polymer, or any other suitable material. The restraint system 18 includes straps 80 coupled between the soft restraint 36 and the seat back 42 of the seat 30. The straps 80 may flexible belts that couple the soft restraint 36 to the seat 30 and enable the soft restraint 36 to be adjusted (e.g., deployed, retracted, etc.) relative to the passenger 12, such as during entry and exit of the passenger 12 from the ride vehicle 14. In an embodiment, the straps 80 are formed from webbing or other woven material.

The soft restraint 36 also includes components of the forced air system 32 integrated with the soft restraint 36. In the illustrated embodiment, the discharge ports 54 of the forced air system 32 are integrated with lateral portions 82 of the soft restraint 36. While the soft restraint 36 may be formed from a pliable material, and the discharge ports 54 may be nozzles 56 formed from a rigid material, such as plastic. In some embodiments, the discharge ports 54 and the soft restraint 36 may be integrated with one another via an overmolding process or another suitable manufacturing technique. The illustrated soft restraint 36 also includes additional discharge ports 54, such as holes 58 or perforations, formed in a base portion 84 of the soft restraint 36. The holes 58 may be punched or cut from the material of the soft restraint 36 and, in certain embodiments, may be reinforced via rings, grommets, or other features configured to maintain a dimension or contour of the holes 58. Further, the discharge ports 54 formed in the base portion 84 are arranged or oriented to direct the air flow 50 upward across the torso 46 of the passenger 12 and toward the face 52 of the passenger 12. Discharge ports 54 may also be formed on or coupled to the lap bar 44 (e.g., crossbar) of the restraint system 18. For example, discharge ports 54 may be secured to a substructure (e.g., metallic substructure) of the lap bar 44. In the illustrated embodiment, the discharge ports 54 integrated with the lap bar 44 are nozzles 56 oriented to direct the air flow 50 upward across the torso 46 of the passenger 12 and toward the face 52 of the passenger 12. In other embodiments, the restraint system 18 may include discharge outlets 54 having other configurations, positions, orientations, and/or other arrangements relative to the components of the restraint system 18 (e.g., the rigid restraint 34, the soft restraint 36, the lap bar 44, or other component of the restraint system 18). Indeed, the restraint system 18 may also include discharge outlets 54 of one type or multiple types in a variety of arrangements.

As similarly discussed above, the discharge ports 54 shown in FIG. 3 are configured to receive the air flow 50 from within the restraint system 18. The soft restraint 36 and/or the lap bar 44 may include one or more of the conduits 60 extending internally through the soft restraint 36 and fluidly coupled with the discharge outlets 54. Additionally or alternatively, the soft restraint 36 may include one or more internal cavities 86 (e.g., an internal bladder) formed or disposed therein and in fluid communication with the discharge outlets 54. In any case, the air flow 50 may be directed into the soft restraint 36 (e.g., to the conduits 60 and/or to the internal cavities 86) via the external conduit 68.

As mentioned above, the external conduit 68 may receive the air flow 50 generated by the flow generating device 64. In the illustrated embodiment, the flow generating device 64 is integrated within the base 51 of the seat 30. In other embodiments, the flow generating device 64 may be disposed beneath the base 51 of the seat 30. The air flow 50 is discharged from the flow generating device 64 and into an internal conduit 88 extending through the base 51 of the seat 30. The internal conduit 88 may be fluidly coupled to the external conduit 68 in order to direct the air flow 50 therethrough. However, in some embodiments, the internal conduit 88 may extend internally through the base 51 and the seat back 42 to direct the air flow 50 internally through the seat 30 to the soft restraint 36 or other component of the restraint system 18.

Other components may also be utilized to generate the air flow 50 and/or direct the air flow 50 toward the face 52 of the passenger 12. For example, the forced air system 32 my include fans or fan modules coupled to the restraint system 18 and/or the seat 30 to generate and direct the air flow 50 toward the face 52 of the passenger 12. In some embodiments, the air flow 50 may be provided via one or more compressed air tanks located at a suitable position in the ride vehicle 14 (e.g., beneath the base 51 of the seat 30) and fluidly coupled to one or more components of the restraint system 18 (e.g., conduits 60, 68, 88).

FIG. 4 is a perspective view of an embodiment of the ride system 10, illustrating the ride vehicle 14 and components of the forced air system 32 integrated with the ride vehicle 14. In particular, the present embodiment illustrates the flow generating device 64 disposed in the ride vehicle 14 separately from the seats 30. For example, the flow generating device 64 may be one or more air compressors 100 (e.g., a variable speed compressor) disposed in a compartment, section, or other secluded area of the ride vehicle 14 that is isolated from the seats 30. The air compressor 100 may be fluidly coupled to the seats 30 and the restraint systems 18 via a conduit network 102, which may include embodiments of the conduits 60, external conduits 68, internal conduits 88, other suitable conduits, or any combination thereof. The conduit network 102 is configured to distribute the air flow 50 generated by the air compressor 100 to each of the restraint systems 18 to enable discharge of the air flow 50 towards each passenger 12 in the ride vehicle 14.

FIG. 5 is a schematic of an embodiment of the ride system 10, illustrating components of the ride vehicle 14 and the seat 30 of the ride vehicle 14. As previously discussed, the seat 30 includes the restraint system 18 having the rigid restraint 34 and/or the soft restraint 36 with components of the forced air system 32 integrated therein. The seat 30 may also include other elements that facilitate operation of the restraint system 18 and, more particularly, the forced air system 32. It should be appreciated that any of the components discussed below may be integrated with the rigid restraint 34, the soft restraint 36, other elements of the restraint system 18, the seat 30, other portions of the ride vehicle 14, or any combination thereof.

The forced air system 32 may include a controller 120 configured to send control signals to other components of the forced air system 32 to regulate operation of the forced air system 32. For example, the controller 120 may be communicatively coupled to the air compressor 100 (i.e., flow generating device 64) to control operation of the air compressor 100 and thereby control the air flow 50 discharged via the discharge ports 54. In some embodiments, the forced air system 32 may include a valve 118 (e.g., solenoid valve), and the controller 120 may be communicatively coupled to the valve 118. The valve 118 is configured to regulate the air flow 50 generated by the flow generating device 64. For example, the valve 118 may be disposed along the conduit network 102 (e.g., disposed along any of the conduits 60, 68, 88 disclosed herein) and may be actuated to control the air flow 50 directed to the discharge ports 54 (e.g., to control a desired effect of the air flow 50 on the passenger 12). Some embodiments may include multiple valves 118, such as one valve 118 associated with first type of discharge ports 54 of the restraint system 18 and another valve 118 associated with a second type of discharge ports 54 of the restraint system 18. The controller 120 may send control signals to the one or more valves 118 to enable operation of the forced air system 32 in various operations modes, such as a constant air flow mode, an intermittent air flow mode, a first mode in which air flow 50 is discharged through a first type of discharge port 54 and/or a second mode in which air flow 50 is discharged through a second type of discharge port 54. In some embodiments, one controller 120 is included in the forced air system 32, but in other embodiments, multiple controllers 120 may be utilized.

The controller 120 may be integrated with the seat 30 or may be located in another portion of the ride vehicle 14. In other embodiments, the controller 120 may be located remote from the ride vehicle 14, such as at a base station of the ride system 10. The controller 120 includes a processor 122 and a memory 124. For example, the processor 102 may be a microprocessor that executes software to control the flow generating device 64 (e.g., air compressor 100), the valve 118, and/or other components to generate and discharge the air flow 50 from the discharge ports 54 in a desired manner. The processor 122 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 122 may include one or more reduced instruction set (RISC) processors.

The memory 124 may include a volatile memory, such as random access memory (RAM), and/or a nonvolatile memory, such as read-only memory (ROM). The memory 104 may store a variety of information and may be used for various purposes. For example, the memory 124 may store processor executable instructions, such as firmware or software, for the processor 122 to execute. The memory 124 may include ROM, flash memory, a hard drive, or any other suitable optical, magnetic, or solid-state storage medium, or a combination thereof. The memory 124 may store data, instructions, and any other suitable data. In operation, the processor 122 executes instructions stored on the memory 124 to generate and/or provide control signals to components of the forced air system 32.

As shown, embodiments of the forced air system 32 may include one or more sensors 126, such as sensors integrated with the restraint system 18. However, other sensors 126 may be positioned elsewhere, such as within the seat 30. The sensors 126 are configured to collect feedback that may be used to further control operation of the forced air system 32. For example, the sensors 126 may be configured to detect a presence or condition of the passenger 12, and the controller 120 may utilize the feedback to adjust operation of the forced air system 32. The sensors 126 may include pressure sensors (e.g., to detect the presence of the passenger 12 in the seat 30, to detect a pressure of the air flow 50 generated by the air compressor 100, etc.), temperature sensors (e.g., to detect a temperature of the passenger 12 or an environment surrounding the ride vehicle 14), position sensors (e.g., to detect a position of the ride vehicle 14 along the ride path 16), flow rate sensors to detect a flow rate of the air flow 50, accelerometers and/or gyroscopes to detect motion and/or orientation of the ride vehicle 14, or any other suitable sensor configured to collect and provide feedback for use in regulating operation of the forced air system 32.

Further, the forced air system 32 may include one or more power sources 128, which are configured to provide electrical power to components of the forced air system 32, such as the flow generating device 64 (e.g., the air compressor 100), the valve 118, the controller 120, and so forth. The power sources 128 may be integrated into the ride vehicle 14 or another portion of the ride system 10. For example, in one embodiment, the power source 128 is a battery positioned within the ride vehicle 14. In another embodiment, the power source 128 may be an electrical connection to another power supply external to the ride vehicle 14. For example, the power source 128 may be electrically coupled to a bus bar of the ride system 10.

The forced air system 32 may also include one or more input devices 130 (e.g., user input device 72). The input device 130 may be configured to receive feedback, via interaction of the passenger 12 or an operator of the ride vehicle 14 or ride system 10 with the input device 130, for use in further regulating operation of the forced air system 32. For example, in one embodiment, the input device 130 is a button or switch that the passenger 12 may toggle to activate and deactivate the forced air system 32. In another embodiment, the input device 130 includes a dial, button, touchscreen, slider, or other component configured to enable an operator of the ride system 10 to adjust settings of the forced air system 32, such as a flow rate of the air flow 50 generated by the forced air system 32 or an operating mode of the forced air system 32.

As illustrated, the forced air system 32 may also include communication circuitry 132 that enables communication with systems external to the ride vehicle 14. For example, the communication circuitry 132 may be configured to communicate with a ride system controller 134 of the ride system 10 (e.g., a central system controller), such as via a wired connection or a wireless connection. The communication circuitry 132 may communicate various types of information to the ride system controller 134 for use in regulation of the ride system 10 operation. Types of information may include a number of passengers 12 in the ride vehicle 14, an identification of occupied and unoccupied seats 30 of the ride vehicle 14, data associated with operating parameters of the forced air system 32, a position of the ride vehicle 14 along the ride path 16, a speed or orientation of the ride vehicle 14, a position or state of the restraint systems 18, or any other suitable information.

The ride system controller 134 includes a processor 136, which may be similar to the processor 122 discussed above, and a memory 138, which may be similar to the memory 124 discussed above. Based on information received from the communication circuitry 132, the ride system controller 134 may regulate operation of the ride system 10. For example, the ride system controller 134 may control the start time of the ride vehicle 14 experience, an end time of the ride vehicle 14 experience, the speed of the ride vehicle 14 on the ride path 16, and so forth. In some embodiments, the ride system controller 134 and the communication circuitry 132 may communicate with one another to coordinate operation of the forced air system 32 with other sensory systems of the ride system 10. For example, the ride system controller 134 and the communication circuitry 132 may coordinate operation of the forced air system 32 to operate in a particular mode (e.g., constant air flow mode, intermittent air flow mode, etc.) when the ride vehicle 14 travels along a particular portion of the ride path 16 and/or to coincide with operation of other elements of the ride system 10 (e.g., the generation of a light/image display and/or sound output of the ride system 10). In an embodiment, the forced air system 32 may be operated to simulate wind when the ride vehicle 14 is approaching a light display simulating a lightning storm. The forced air system 32 may also be operated to generate a constant, relatively low air flow across the face 52 of the passenger 12 to mitigate onset of kinetosis during one or more portions of the passenger 12 experience in the ride vehicle 14.

Accordingly, embodiments of the present disclosure are directed toward a ride vehicle restraint system having an integrated forced air system. The forced air system includes components integrated with the restraint system that are configured to direct an air flow through (e.g., internally through) the restraint system and discharge the air flow toward a passenger, such as towards a face of the passenger, secured in a ride vehicle via the restraint system. The forced air system may be operated to generate sensory effects coordinated with operation of a ride system and/or to mitigate effects or inducement of kinetosis during operation of the ride vehicle (e.g., by directing the air flow towards the face of the passenger). Indeed, by integrating the forced air system with the restraint system, supplemental or dedicated support structures traditionally included with ride vehicles to accommodate forced air systems may be eliminated and/or the forced air system may be incorporated with ride vehicles that would otherwise be unable to provide forced air flow for ride vehicle passengers. It should be appreciated that any and all of the features, elements, techniques, and/or components described herein may be used in any combination with one another.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A ride vehicle system, comprising:
   a ride vehicle comprising a seat configured to accommodate a passenger;
   a restraint system of the ride vehicle, wherein the restraint system comprises a restraint configured to secure the passenger within the seat; and a forced air system of the ride vehicle, wherein the forced air system is configured to generate an air flow, direct the air flow internally through the restraint, and discharge the air flow toward the passenger via a discharge port of the restraint.

2. The ride vehicle system of claim 1, wherein the discharge port is configured to discharge the air flow toward a face of the passenger.

3. The ride vehicle system of claim 1, wherein the restraint comprises a rigid restraint configured to extend across a torso of the passenger, and the rigid restraint comprises the discharge port.

4. The ride vehicle system of claim 3, wherein the discharge port comprises a nozzle coupled to the rigid restraint, an aperture formed in the rigid restraint, or both.

5. The ride vehicle system of claim 4, wherein the rigid restraint comprises over-shoulder bars.

6. The ride vehicle system of claim 3, wherein the forced air system comprises a conduit fluidly coupled to the discharge port and extending internally through the rigid restraint, and the conduit is configured to direct the air flow therethrough.

7. The ride vehicle system of claim 3, wherein the rigid restraint comprises a hollow, rigid structure defining an internal cavity, the internal cavity is fluidly coupled to the discharge port, and the forced air system is configured to direct the air flow through the internal cavity to the discharge port.

8. The ride vehicle system of claim 1, wherein the restraint comprises a soft restraint configured to conform to a body of the passenger, the discharge port is coupled to the soft restraint, the soft restraint is formed from a first material, and the discharge port is formed from a second material, and the first and second material are different.

9. The ride vehicle system of claim 1, wherein the forced air system comprises a compressor configured to generate the air flow and direct the air flow toward an internal portion of the restraint.

10. The ride vehicle system of claim 9, wherein the forced air system comprises a valve fluidly coupled between the compressor and the internal portion of the restraint, and the valve is configured regulate a flow rate of the air flow.

11. The ride vehicle system of claim 1, wherein the forced air system comprises a controller configured to operate the forced air system in a first mode to provide a constant flow of the air flow at a first flow rate and to operate the forced air system in a second mode to provide intermittent bursts of the air flow at a second flow rate, wherein the second flow rate is greater than the first flow rate.

12. A method for providing an air flow to a ride vehicle passenger, the method comprising:
securing the ride vehicle passenger within a seat of a ride vehicle with a restraint of the ride vehicle extending across a torso of the ride vehicle passenger;
generating the air flow with a flow generating device of the ride vehicle;
directing the air flow internally through the restraint of the ride vehicle; and
discharging the air flow toward the ride vehicle passenger via a discharge port of the restraint.

13. The method of claim 12, wherein discharging the air flow toward the ride vehicle passenger via the discharge port of the restraint comprises discharging the air flow toward a face of the ride vehicle passenger.

14. The method of claim 12, wherein directing the air flow internally through the restraint of the ride vehicle comprises directing the air flow through a conduit disposed within the restraint.

15. The method of claim 12, wherein directing the air flow internally through the restraint of the ride vehicle comprises directing the air flow through an internal cavity defined by a hollow structure of a rigid restraint.

16. The method of claim 12, wherein generating the air flow with the flow generating device of the ride vehicle comprises generating the air flow with a compressor disposed in the ride vehicle.

17. The method of claim 12, wherein discharging the air flow toward the ride vehicle passenger via the discharge port of the restraint comprises discharging a constant air flow toward a face of the ride vehicle passenger, discharging intermittent bursts of the air flow toward the face of the ride vehicle passenger, or both.

18. A ride vehicle for an amusement park ride, comprising:
a seat configured to accommodate a passenger;
a restraint system of the ride vehicle comprising a restraint configured to extend across a torso of the passenger to secure the passenger within the seat;
a forced air system of the ride vehicle, wherein the forced air system is integrated with the restraint and is configured to generate an air flow, direct the air flow internally through the restraint, and discharge the air flow toward a face of the passenger; and
a controller configured to regulate operation of the forced air system to discharge the air flow toward the face of the passenger at a constant flow rate.

19. The ride vehicle of claim 18, wherein the controller is configured to regulate operation of the forced air system to discharge the air flow toward the face of the passenger at the constant flow rate in a first operating mode, and the controller is configured to regulate operation of the forced air system to discharge the air flow toward the face of the passenger in intermittent bursts in a second operating mode.

20. The ride vehicle of claim 18, wherein the forced air system comprises discharge ports configured discharge the air flow toward the face of the passenger, wherein the discharge ports are coupled to the restraint, integrally formed within the restraint, or both.

* * * * *